(12) United States Patent
Xie

(10) Patent No.: US 7,709,119 B2
(45) Date of Patent: May 4, 2010

(54) METHOD FOR OPERATING FUEL CELL

(75) Inventor: Gang Xie, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 1159 days.

(21) Appl. No.: 11/320,644

(22) Filed: Dec. 30, 2005

(65) Prior Publication Data

US 2006/0166055 A1 Jul. 27, 2006

(30) Foreign Application Priority Data

Jan. 21, 2005 (JP) .............................. 2005-013601

(51) Int. Cl.
*H01M 8/04* (2006.01)
(52) U.S. Cl. .......................................... 429/13; 429/21
(58) Field of Classification Search .................... 429/13
See application file for complete search history.

(56) References Cited

U.S. PATENT DOCUMENTS

| 6,472,090 | B1 * | 10/2002 | Colbow et al. ................. 429/13 |
| 6,645,654 | B2 | 11/2003 | Yagi |
| 2004/0185328 | A1 * | 9/2004 | Lin et al. ....................... 429/50 |
| 2005/0227126 | A1 * | 10/2005 | Korytnikov et al. ............ 429/13 |

FOREIGN PATENT DOCUMENTS

| JP | 2-126565 | | 5/1990 |
| JP | 06-333586 | * | 2/1994 |
| JP | 10-144334 | | 5/1998 |
| JP | 11-26003 | | 1/1999 |
| JP | 11-191424 | | 7/1999 |
| JP | 2001-345114 | | 12/2001 |
| JP | 2004-253220 | | 9/2004 |

* cited by examiner

*Primary Examiner*—Dah-Wei D Yuan
*Assistant Examiner*—Jacob Marks
(74) *Attorney, Agent, or Firm*—Oblon, Spivak, McClelland, Maier & Neustadt, L.L.P.

(57) ABSTRACT

In a method for operating a fuel cell including an electrolyte membrane sandwiched by a fuel electrode and an oxidizing agent electrode, the method includes a hydrogen feedback process either before starting operation of the fuel cell or after stopping operation of the fuel cell. The hydrogen feedback process includes the processes of a process for electrically connecting a positive electrode of an external electric power source to the oxidizing agent electrode of the fuel cell, a process for electrically connecting a negative electrode of the external electric power source to the fuel electrode of the fuel cell, a process for oxidizing hydrogen remaining in the oxidizing agent electrode to generate protons, the hydrogen contained in the fuel, and a process for reducing the protons, transferred to the fuel electrode from the oxidizing agent electrode through the electrolyte membrane, into hydrogen.

18 Claims, 5 Drawing Sheets

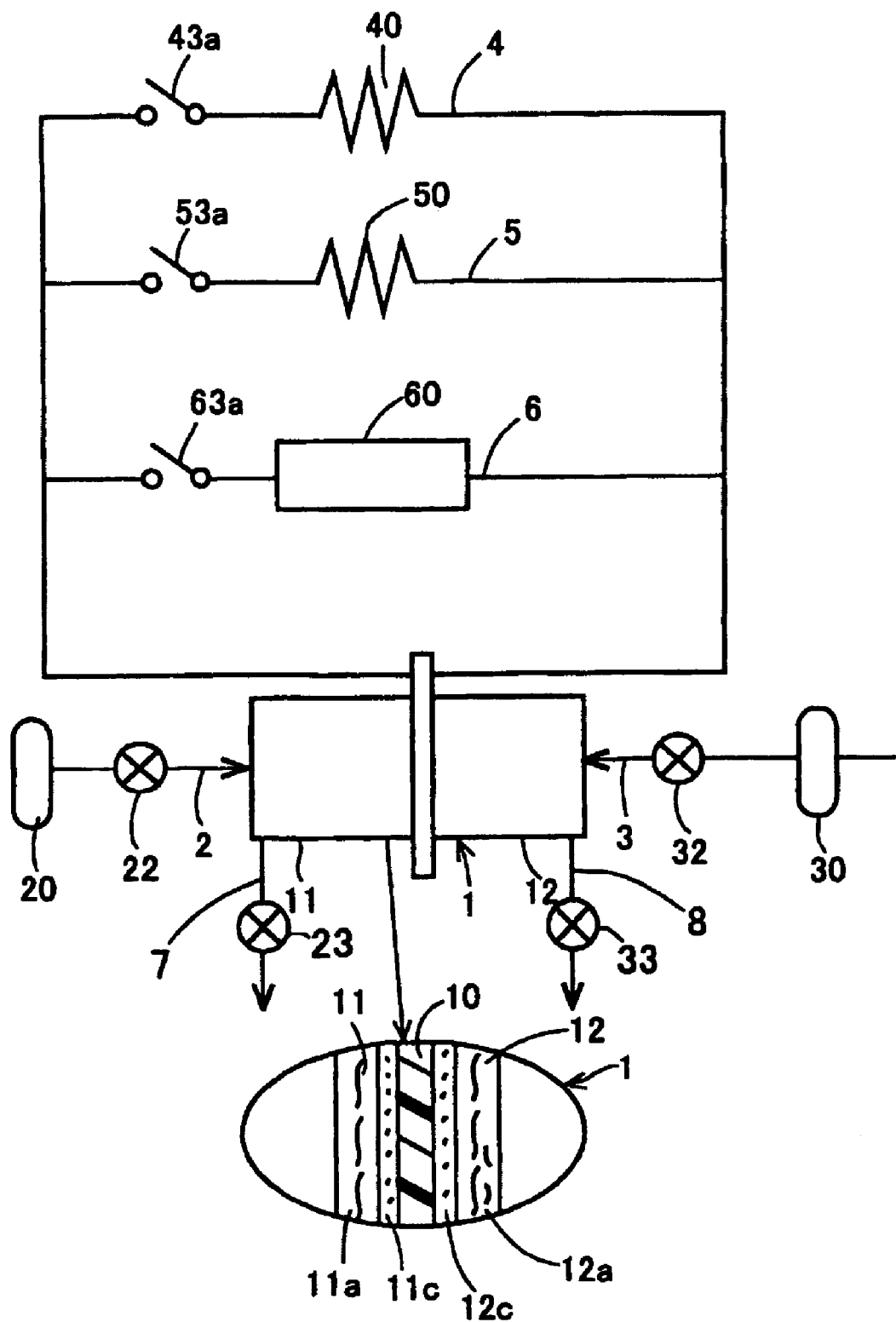
F I G. 1

(1) Fuel electrode $\quad H_2 \rightarrow 2H^+ + 2e^-$ (2) Oxidizing agent electrode $\quad \frac{1}{2}O_2 + 2e^- + 2H^+ \rightarrow H_2O$ (3) Fuel electrode $\quad H_2 \rightarrow 2H^+ + 2e^-$ (4) Oxidizing agent electrode $\quad 2H^+ + 2e^- \rightarrow H_2$ (5) Fuel electrode    $2H^+ + 2e^- \rightarrow H_2$ (6) Oxidizing agent electrode    $H_2 \rightarrow 2H^+ + 2e^-$

METHOD FOR OPERATING FUEL CELL

CROSS REFERENCE TO RELATED APPLICATIONS

This application is based on and claims priority under 35 U.S.C. §119 to Japanese Patent Application 2005-013601, filed on Jan. 21, 2005, the entire content of which is incorporated herein by reference.

FIELD OF THE INVENTION

This invention generally relates to a method for operating a fuel cell. More particularly, this invention pertains to a method for operating a fuel cell which advantageously inhibits chemical short and local cell phenomena.

BACKGROUND

Some techniques have been disclosed in relation to stopping or starting operation of a fuel cell. JPH10-144334A (document 1) discloses one of such techniques. According to the document, when a fuel cell stops operation, inert gas is introduced into an anode and a cathode, and a dummy resistor is inserted into a circuit of the fuel cell. The dummy resistor consumes cell current and thus lowers circuit voltage. Accordingly, degradation of a catalyst can be inhibited. JPH2-126565A (JP2621435B, document 2) discloses a basically same technique as in the document 1. According to the document 2, when a fuel cell stops operation, a circuit of the fuel cell and a dummy resistor are electrically connected. The dummy resistor consumes cell current and thus lowers a cell voltage. By doing so, degradation of a catalyst can be inhibited. Further, JPH11-26003A (document 3) discloses a basically same technique as in the document 1. According to the document 3, when a fuel cell stops operation, a circuit of a fuel cell and a dummy resistor are electrically connected. The dummy resistor consumes cell current.

JPH11-191424A (document 4) discloses a method for operating a fuel cell. According to the document 4, after a fuel cell system stops operation, in other words, after supply of a fuel gas is stopped, a circuit of a fuel cell is switched to a storage portion provided in parallel with an electric power load in order for charging the storage portion. By doing so, a voltage between output terminals of the fuel cell can be lowered.

JP2004-253220A (document 5) discloses a following method. According to the document 5, a direct current (DC)-direct current (DC) converter is provided between a fuel cell and a storage portion. By doing so, even when a voltage between terminals of the fuel cell is lower than that of the storage portion, the storage portion can be further charged. Further, JP2001-345114A (document 6) discloses a following method. According to the document 6, when a fuel cell stops operation, a discharge resistor provided between the fuel cell terminals and connected therewith is controlled in order for consuming all of reaction gas. Incidentally, at this time, inert gas is not utilized.

With respect of the document 1, requirements for storing and replenishing inert gas would complicate a system and thus cause to raise costs for such system. This disadvantageous situation would arise in techniques according to the documents 2 and 3, as the techniques according to the documents 2 and 3 are based on similar idea to the document 1, even though some modifications are made.

Further, according to the document 4 described above, as the charging progresses, the voltage between the terminals of the fuel cell is lowered and the voltage of the storage portion is raised. Accordingly, there is a danger that the voltage between the terminals of the fuel cell become equal to the voltage of the storage portion and then electricity generation of the fuel cell is stopped. In other words, there is a danger that hydrogen is not completely consumed, and remains in a fuel electrode side, and oxygen is not completely consumed, and remains in an oxidizing agent electrode side. In such a case, hydrogen in the fuel electrode side would transfer to the oxidizing agent electrode side through an electrolyte membrane. Accordingly, there is a danger that the transferred hydrogen interacts with the oxygen and the interaction cause to chemical short. In this case, there is a danger that an electrolytic component contained in the electrolyte membrane and catalyst layers be damaged by combustion heat, and hydrogen peroxide and OH radicals, or the like, produced by a local cell.

According to the document 5, because the DC-DC converter is provided between the fuel cell and the storage portion, the storage portion can be further charged even when the voltage of the terminals of the fuel cell is lower than the voltage of the storage portion. However, it is difficult for this technique to completely solve adverse effects arisen in the document 4. In the method according to the document 6, if an amount of hydrogen and an amount of oxygen in respective electrode sides are not identical in terms of chemical equivalent, excess amount of gas in terms of chemical equivalent cannot react. As a result, the gas would distribute in both electrode sides in the same concentration by concentration cell effect or gas permeation. Accordingly, when the fuel cell is restarted, such remaining gas would interact with oxygen or hydrogen freshly supplied, and chemical short and local cell phenomena would occur. As a result, there is a danger that the electrolyte membrane is damaged or an electrolyte membrane in the catalyst layer is damaged.

A need thus exists for a method for operating a fuel cell, which is advantageous to reduce possibility of interactions with hydrogen or oxygen supplied to the fuel cell, to inhibit chemical short and local cell phenomena, and to reduce possibility of damaging an electrolytic component contained in an electrolyte membrane and catalyst layers. The present invention has been made in view of the above circumstances and provides such a method for operating a fuel cell.

SUMMARY OF THE INVENTION

According to an aspect of the present invention, in a method for operating a fuel cell including an electrolyte membrane sandwiched by a fuel electrode to which a fuel is supplied and an oxidizing agent electrode to which an oxidizing agent is supplied for generating electricity supplied to an electric power load, the method includes a hydrogen feedback process either before starting operation of the fuel cell or after stopping operation of the fuel cell. The hydrogen feedback process includes the processes of a process for electrically connecting a positive electrode of an external electric power source to the oxidizing agent electrode of the fuel cell, a process for electrically connecting a negative electrode of the external electric power source to the fuel electrode of the fuel cell, a process for oxidizing hydrogen remaining in the oxidizing agent electrode to generate protons, the hydrogen contained in the fuel, and a process for reducing the protons, transferred to the fuel electrode from the oxidizing agent electrode through the electrolyte membrane, into hydrogen.

BRIEF DESCRIPTION OF THE DRAWINGS

The foregoing and additional features and characteristics of the present invention will become more apparent from the following detailed description considered with reference to the accompanying drawings, wherein:

FIG. 1 represents a schematic diagram illustrating a fuel cell;

DETAILED DESCRIPTION

Figure 2:
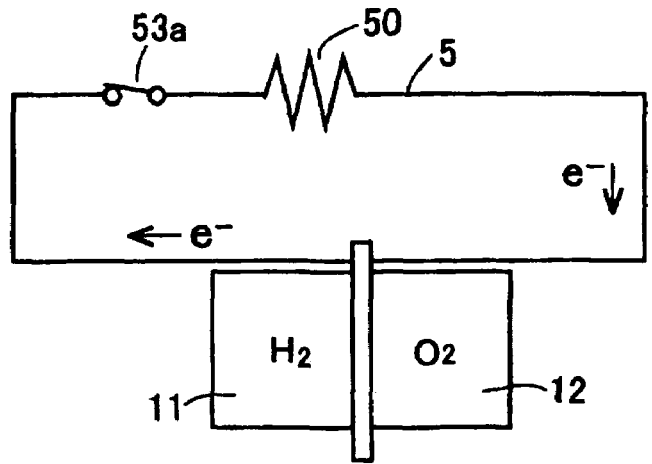
FIG. 2 represents a schematic diagram illustrating a situation in which a discharge process is performed.

An embodiment of the present invention will be explained. According to the embodiment, a fuel cell has an electrolyte membrane sandwiched by a fuel electrode and an oxidizing agent electrode. A fuel is supplied to the fuel electrode and an oxidizing agent is supplied to the oxidizing agent electrode for generating electricity. The generated electricity is supplied to an electric power load. According to the embodiment, in this method, an external electric power source is utilized. A positive electrode of the external electric power source is electrically connected to the oxidizing agent electrode of the fuel cell, and a negative electrode of the external electric power source is electrically connected to the fuel electrode of the fuel cell. By doing so, hydrogen remaining in the oxidizing agent electrode of the fuel cell, the hydrogen contained in the fuel, is oxidized into protons, and the protons transferred from the oxidizing agent electrode through the electrolyte membrane to the fuel electrode are reduced into hydrogen. This process will be referred as a hydrogen feedback process. The hydrogen feedback process can be performed before starting operation of the fuel cell or after stopping operation of the fuel cell. The term "after stopping operation of the fuel cell" includes a temporary stop of the fuel cell operation.

In the hydrogen feedback process, the positive electrode of the external electric power source is electrically connected to the oxidizing agent electrode of the fuel cell, and the negative electrode of the external electric power source is electrically connected to the fuel electrode of the fuel cell. By doing so, hydrogen contained in the fuel and transferred from the fuel electrode of the fuel cell through the electrolyte membrane to the oxidizing agent electrode is oxidized into protons, and the protons transferred from the oxidizing agent electrode through the electrolyte membrane to the fuel electrode are reduced into hydrogen. Before the hydrogen feedback process, a disconnecting process, in which the fuel cell is disconnected from the electric load, is performed.

According to the embodiment, the hydrogen feedback process can be performed at least either one of before starting operation of the fuel cell or after stopping operation of the fuel cell. The hydrogen feedback process can be continuously or intermittently performed until the fuel cell is restarted. If the external electric power source is intermittently utilized, electric energy consumed by the external electric power source can be economized.

A voltage of the external electric power source used in the hydrogen feedback process can be set so that a voltage, lower than a start voltage of water electrolysis but higher than a unit cell voltage, is applied to the unit cell. Accordingly, generation of hydrogen and oxygen caused by water electrolysis can be inhibited. If the voltage of the external electric power source is lower than the voltage generated by the unit cell, the external electric power source would be charged. For preventing this, the voltage of the external electric power source in the hydrogen feedback process must be higher than the unit cell voltage. The voltage of the external electric power source in the hydrogen feedback process can be lower than corrosion voltage of part materials such as separators of the fuel cell. By doing so, corrosion of the part material such as separators can be advantageously inhibited.

Incidentally, if a fuel cell is configured from stacked plural cells, the voltage of the external electric power source in the hydrogen feedback process can be increased as the number of stacked cells increases.

Before the hydrogen feedback process, a remaining hydrogen controlling process can be performed in which the amount of hydrogen remaining in the fuel electrode side of the fuel cell, the hydrogen contained in the fuel gas, is set richer than the amount of oxygen remaining in the oxidizing agent electrode side in terms of chemical equivalent. The remaining hydrogen controlling process can include a discharge process, in which the fuel electrode and the oxidizing agent electrode are electrically connected through an electric power-consuming portion after stopping operation of the fuel cell. In the discharge process, when at least one of following conditions, firstly, when current flowing in the fuel electrode and the oxidizing agent electrode becomes less than a threshold current, and secondly, potential difference between the fuel electrode and the oxidizing agent electrode becomes less than a threshold voltage, is fulfilled, the hydrogen feedback process can be performed.

As the electric power-consuming portion, a discharge resistor can be utilized. Further, the electric power-consuming portion can include a discharge resistor, which consumes electric power by discharging, and a chargeable portion, which consumes electric power by charging. When the fuel cell stops operation, if the discharging current is used for charging the chargeable portion, electric power can be effectively utilized. Incidentally, as the electric power-consuming portion, an electric power load can be employed.

The fuel cell-electricity-generating system can include a fuel valve for supplying a fuel to the fuel electrode side, a fuel outlet blocking valve for blocking the outlet of the fuel from the fuel electrode side, an oxidizing-agent valve for supplying an oxidizing agent to the oxidizing agent electrode, and an oxidizing-agent outlet blocking valve for blocking the outlet of the oxidizing agent from the oxidizing agent electrode side. The remaining hydrogen controlling process can include a valve closing process for closing the fuel valve, the fuel outlet blocking valve, the oxidizing-agent valve, and the oxidizing-agent outlet blocking valve so that the amount of hydrogen in the fuel electrode be richer than the amount of oxygen in the oxidizing agent electrode in terms of chemical equivalent.

A first example will be explained with reference to FIGS. 1 to 5. As illustrated in FIG. 1, a fuel cell system includes a fuel cell 1 including a polymer electrolyte membrane 10 sandwiched by a fuel electrode 11 and an oxidizing agent electrode 12. Further, the fuel cell system includes a fuel-supply passage 2 for supplying a fuel containing hydrogen from a fuel source 20 to the fuel electrode 11 of the fuel cell 1, a fuel outlet passage 7 for letting the fuel out from the fuel electrode 11 of the fuel cell 1, an oxidizing-agent-supply passage 3 for supplying an oxidizing-agent gas (generally air) containing oxygen to the oxidizing agent electrode 12 of the fuel cell 1 through a humidifier 30, an oxidizing-agent outlet passage 8 for letting the oxidizing-agent gas out from the oxidizing agent electrode of the fuel cell 1, an electric load circuit 4 including an electric power load 40, a discharge circuit 5 serving as an electric power-consuming portion including a discharge resistor 50 provided in parallel with the electric power load 40, and an external electric power source circuit 6 including an external electric power source 60. The fuel-supply passage 2 includes a fuel valve 22. The oxidizing-agent-supply passage 3 includes an oxidizing-agent valve 32. The fuel outlet passage 7 includes a fuel outlet blocking valve 23. The oxidizing-agent outlet passage 8 includes an oxidizing-agent outlet blocking valve 33. Each of the electric power load 40, the discharge resistor 50, and the external electric power source 60 is provided in parallel with the fuel cell 1.

The fuel electrode 11 of the fuel cell 1 includes a fuel gas diffusion layer 11a, which is gas-permeable, and a fuel side catalyst layer 11c containing catalytic, electrolytic, and conductive components. The oxidizing agent electrode 12 of the fuel cell 1 includes an oxidizing-agent gas diffusion layer 12a, which is gas-permeable, and an oxidizing-agent side catalyst layer 12c containing catalytic, electrolytic, and conductive components. The fuel side catalyst layer 11c and the oxidizing-agent side catalyst layer 12c can be adhered onto both sides of the electrolyte membrane 10. Incidentally, FIG. 1 represents a case where a fuel cell includes one unit cell.

Further, as illustrated in FIG. 1, the fuel cell 1 includes a first switching element 43a for connecting or disconnecting the electric power load 40 to or from the fuel cell 1, a second switching element 53a for connecting or disconnecting the discharge resistor 50 to or from the fuel cell 1, and a third switching element 63a for connecting or disconnecting the external electric power source 60 to or from the fuel cell 1.

In an electricity-generating process, the fuel valve 22 and the fuel outlet blocking valve 23 are opened for supplying the fuel gas containing hydrogen as a major component from the fuel-supply passage 2 to the fuel electrode 11 of the fuel cell 1. Further, the oxidizing-agent valve 32 and the oxidizing-agent outlet blocking valve 33 are opened for supplying the oxidizing-agent gas (generally air) containing oxygen as a major component from the oxidizing-agent-supply passage 3 to the oxidizing-agent electrode 12 of the fuel cell 1. By doing so, electricity-generating reaction occurs in the fuel cell 1, and electricity is generated. The electricity-generating reaction produces water in the oxidizing-agent electrode 12 of the fuel cell 1. While electricity is generated, the first switching element 43a is ON, and the electric power load 40 and the fuel cell 1 are electrically connected. However, because the second switching element 53a and the third switching element 63a are OFF, the external electric source 60 and the discharge resistor 50 are electrically disconnected from the fuel cell 1.

The fuel cell 1 stops operation as follows. Firstly, the disconnecting process, on the basis of a stop command from a user or a control apparatus, is performed in which the electric power source 40 is electrically disconnected from the fuel cell 1. In this case, the first switching element 43a is switched OFF.

In this example, before the hydrogen feedback process is performed, the remaining hydrogen controlling process is performed. In the remaining hydrogen controlling process, the amount of hydrogen remaining in the fuel electrode 11 side of the fuel cell 1, the hydrogen contained in the fuel gas, is set richer than the amount of oxygen remaining in the oxidizing agent electrode 12 side of the fuel cell 1 in terms of chemical equivalent. The remaining hydrogen controlling process includes a valve closing process and a discharge process. Here, a sentence "the amount of hydrogen remaining in the fuel electrode 11 side of the fuel cell 1 is richer than the amount of oxygen remaining in the oxidizing agent electrode 12 side of the fuel cell 1 in terms of chemical equivalent" can be read as follows. On the basis of a chemical equation "$2H_2 + O_2 = 2H_2O$", 1 mole of $O_2$ is chemically equivalent to 2 moles of $H_2$. Accordingly, "the amount of hydrogen is richer than the amount of oxygen in terms of chemical equivalent" means that the amount of moles of $H_2$ existing in the fuel electrode 11 side exceeds 2 times the amount of moles of $O_2$ existing in the oxidizing agent electrode 12 side.

In the valve closing process described above, timings for closing the fuel valve 22, the fuel outlet blocking valve 23, the oxidizing-agent valve 32, and the oxidizing-agent outlet blocking valve 33 are set with a target that the amount of hydrogen remaining in the fuel electrode 11 side of the fuel cell 1, the hydrogen contained in the fuel gas, becomes richer than the amount of oxygen remaining in the oxidizing agent electrode 12 side of the fuel cell 1, the oxygen contained in the oxidizing-agent gas, in terms of chemical equivalent. In this case, factors can be considered such as a difference between a volume of a gas passage for the oxidizing agent electrode 12 side and a volume of a gas passage for the fuel electrode 11 side, a difference between a pressure of the oxidizing-agent gas in the oxidizing agent electrode 12 side and a pressure of the fuel gas in the fuel electrode 11 side, a difference between a time for closing the fuel valve 22 and a time for closing the fuel outlet blocking valve 23, and a difference between a time for closing the 32 and a time for closing the 33.

In this case, the amount of hydrogen and the amount of oxygen can be controlled by controlling a sealed volume of gas in the fuel electrode 11 side and the oxidizing agent electrode 12 side. In this situation, operations of the fuel valve 22, the fuel outlet blocking valve 23, the oxidizing-agent valve 32, and the oxidizing-agent outlet blocking valve 33 can be simultaneously closed. Alternatively, a stop time of supply of the fuel valve 22 can be shifted from a stop time of supply of the oxidizing-agent valve 32 so that a volume of gas sealed in the fuel electrode 11 side becomes larger than a volume of gas sealed in the oxidizing agent electrode 12 side. Here, the term "a volume of sealed gas" means a volume of a gas under a standard condition (0° C., 1 atm). In other words, a time for stopping supply from the fuel valve 22 is shifted from a time for stopping supply from the oxidizing-agent valve 32 so that the amount of hydrogen contained in the fuel sealed into the fuel electrode 11 side becomes larger than the amount of oxygen sealed into the oxidizing agent electrode 12 side in terms of chemical equivalent. Alternatively, the amount of hydrogen and oxygen can be controlled by controlling pressure difference of sealed gas between in the fuel electrode 11 side and the oxidizing agent electrode 12 side. In this case, a pressure of the sealed fuel gas and a pressure of the sealed oxidizing-agent gas are controlled so that the amount of hydrogen contained in the fuel gas sealed in the fuel electrode 11 side becomes larger than the amount of oxygen sealed in the oxidizing agent electrode 12 side in terms of chemical equivalent.

In the discharge process, the fuel electrode 11 and the oxidizing agent electrode 12 of the fuel cell 1 are electrically connected through the discharge resistor 50 of the discharge circuit 5 (illustrated in FIG. 2). In this case, while the first switching element 43a and the third switching element 63a are OFF, the second switching element 53a for electrically connecting the discharge resistor 50 to the fuel cell is switched ON. When the fuel electrode 11 and the oxidizing agent electrode 12 of the fuel cell 1 are thus electrically connected through the discharge resistor 50 of the discharge circuit 5, hydrogen molecules contained in the fuel gas remaining in the fuel electrode 11, are oxidized into protons ($H^+$) and electrons ($e^-$) according to chemical equation (1) illustrated in FIG. 2. The electrons ($e^-$) are transferred to the oxidizing agent electrode 12 through the discharge circuit 5. Then, the oxygen remaining in the oxidizing agent electrode 12 reacts with the protons ($H^+$) transferred to the oxidizing agent electrode 12 through the electrolyte membrane 10 and the electrons ($e^-$) transferred to the oxidizing agent electrode 12 through the discharge circuit 5, and is turned into water according to chemical equation (2) illustrated in FIG. 2. The oxygen remaining in the oxidizing agent electrode 12 is gradually consumed and turned into water in the oxidizing agent electrode 12 according to chemical equation (2) illustrated in FIG. 2. Ideally, the amount of oxygen remaining in the oxidizing agent electrode 12 becomes 0.

Figure 3:
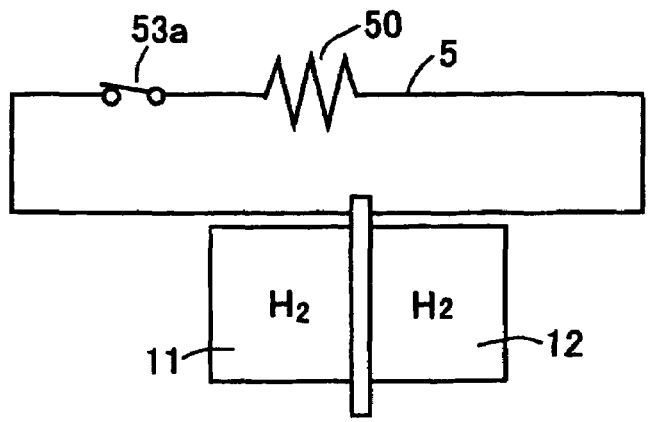
FIG. 3 represents a schematic diagram illustrating a situation in which the discharge process is performed.

According to the example, once the oxygen remaining in the oxidizing agent electrode 12 side of the fuel cell 1 is consumed according to chemical equation (2), the discharge circuit 5 including the discharge resistor 50 is kept to be electrically connected to the fuel electrode 11 and the oxidizing agent electrode 12 of the fuel cell 1 (illustrated in FIG. 3). At this time, because a concentration of hydrogen is high in the fuel electrode 11 side and a concentration of hydrogen is low in the oxidizing agent electrode 12 side, the fuel electrode 11 side in which a concentration of hydrogen is high and the oxidizing agent electrode 12 side in which a concentration of hydrogen is low configure a hydrogen concentration cell, which has electromotive force. Accordingly, in the fuel electrode 11 side in which a concentration of hydrogen is high, according to chemical equation (3) illustrated in FIG. 3, hydrogen molecules are ionized, and protons ($H^+$) and electrons ($e^-$) are produced. Then, the protons ($H^+$) are transferred to the opposite side electrode, in other words, the oxidizing agent electrode 12 side through the electrolyte membrane 10 of the fuel cell 1. Further, electrons ($e^-$) emitted from the fuel electrode 11 are transferred to the oxidizing agent electrode 12 through the discharge circuit 5.

Then, in the oxidizing agent electrode 12, the protons ($H^+$) transferred to the oxidizing agent electrode 12 side from the fuel electrode 11 through the electrolyte membrane 10 react with electrons ($e^-$) transferred to the oxidizing agent electrode 12 from the fuel electrode 11 through the discharge circuit 5 according to chemical equation (4) illustrated in FIG. 3. In other words, the protons transferred to the oxidizing agent electrode 12 are reduced into hydrogen molecules, and as a result, hydrogen is produced. At this time, because oxygen in the oxidizing agent electrode 12 has been consumed, interactions between oxygen and hydrogen can be inhibited. When a concentration of hydrogen in the fuel electrode 11 becomes equal to that in the oxidizing agent electrode 12, reactions according to chemical equations (3) and (4) terminate. As results, a voltage between a terminal of fuel electrode 11 and a terminal of the oxidizing agent electrode 12 of the fuel cell 1 becomes 0 volt, and current flowing in the discharge circuit 5 becomes 0 ampere.

As described above, after oxygen remaining in the oxidizing agent electrode 12 side of the fuel cell 1 is consumed, the hydrogen feedback process is performed. In the hydrogen feedback process, the positive electrode of the external electric power source 60 and the oxidizing agent electrode 12 of the fuel cell 1 are electrically connected and the negative electrode of the external electric power source 60 and the fuel electrode 11 of the fuel cell 1 are electrically connected. Here, in view of a practical system configuration, if an apparatus for accurately and actually measuring a concentration of oxygen remaining in the oxidizing agent electrode 12 side is provided, the system would be complex and costs would be raised.

For overcoming this, according to the example, when a condition that the level of current flowing in the discharge circuit 5 becomes 0, or when another condition that the level of voltage between the terminal of the fuel electrode 11 and the terminal of the oxidizing agent electrode 12 becomes 0, is fulfilled, partial pressure of hydrogen in the fuel electrode 11 is considered to be equal to a partial pressure of hydrogen in the oxidizing agent electrode 12.

Figure 4:
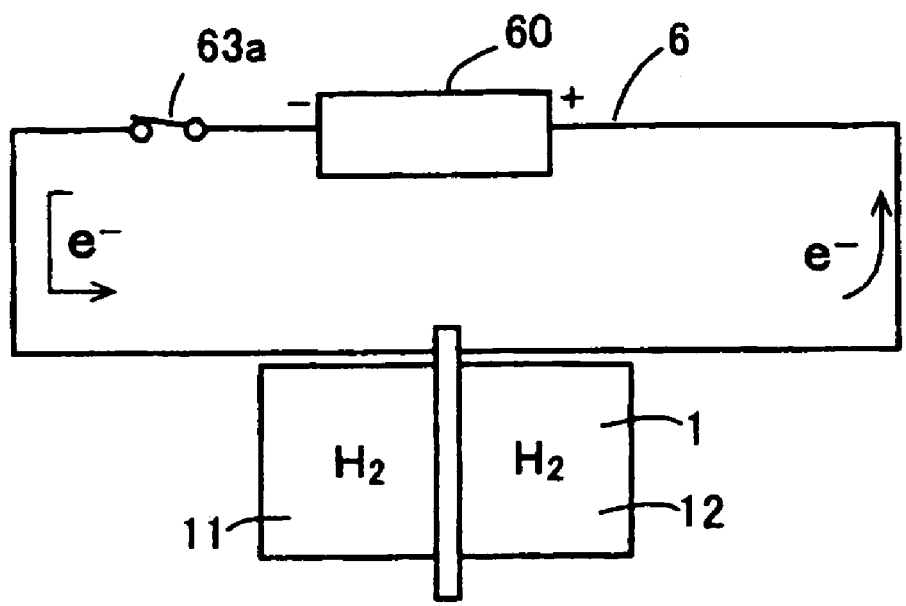
FIG. 4 represents a schematic diagram illustrating a situation in which a hydrogen feedback process is performed.

Then, the hydrogen feedback process is performed as follows. As illustrated in FIG. 4, the positive electrode, having an electron accepting function, of the external electric power source 60 and the oxidizing agent electrode 12 of the fuel cell 1 are electrically connected, and the negative electrode, having an electron providing function, of the external electric power source 60 and the fuel electrode 11 of the fuel cell 1 are electrically connected. Then, the third switching element 63$a$ is switched ON. At this time, the first switching element 43$a$ and the second switching element 53$a$ are OFF, in other words, the electric power load 40, the discharge resistor 50, and the fuel cell 1 are not electrically connected.

When the hydrogen feedback process is performed as described above, an opposite phenomenon of the hydrogen concentration cell described above occurs. In other words, hydrogen exist in the oxidizing agent electrode 12 is oxidized, and according to chemical equation (6) illustrated in FIG. 4, hydrogen is turned into protons ($H^+$) and electrons ($e^-$). The protons ($H^+$) transfer to the fuel electrode 11 from the oxidizing agent electrode 12 through the electrolyte membrane 10. Then, the protons ($H^+$) transferred to the fuel electrode 11 from the oxidizing agent electrode 12 are reduced into hydrogen again according to chemical equation (5) illustrated in FIG. 4.

In the hydrogen feedback process described above, when the level of current flowing in the external electric power source circuit 6 becomes 0 ampere, the amount of hydrogen in the oxidizing agent electrode 12 side can be assumed to substantially be 0. Accordingly, after the level of current flowing in the external electric power source circuit 6 is detected by a detecting means to be 0 ampere, the fuel cell 1 can be restarted.

As described above, according to this example, when the fuel cell 1 stops operation, the fuel valve 22, the fuel outlet blocking valve 23, the oxidizing-agent valve 32, and the oxidizing-agent outlet blocking valve 33 are closed in the valve closing process with a target that the amount of hydrogen remaining in the fuel electrode 11 side of the fuel cell 1, the hydrogen contained in the fuel gas, becomes richer than the amount of oxygen contained in the oxidizing-agent gas remaining in the oxidizing agent electrode 12 side in terms of chemical equivalent, oxygen remaining in the oxidizing agent electrode 12 side is consumed in the discharge process, and hydrogen transferred to the oxidizing agent electrode 12 side from the fuel electrode 11 side through the electrolyte membrane 10 is fed back to the fuel electrode 11 side again in the hydrogen feedback process.

Incidentally, a voltage of the external electric power source 60 used in the hydrogen feedback system is set so that a voltage, lower than a start voltage of water electrolysis but higher than a cell voltage of the unit cell of the fuel cell 1, is applied to the unit cell of the fuel cell in order that water electrolysis in the fuel cell 1 can be inhibited while hydrogen exist in the oxidizing agent electrode 12 is oxidized. Precisely, a voltage of the external electric power source 60 is set 1.23 volt or less. Accordingly, generation of hydrogen caused by water electrolysis can be inhibited. The oxidation of the hydrogen in the oxidizing agent electrode 12, in other words, the hydrogen feedback process, can continue until hydrogen becomes absent in the oxidizing agent electrode 12 side.

According to this example, until the fuel cell 1 is restarted, the electrical connection of the external electric power source 60 to the fuel cell 1 is continuously maintained. In other words, until the fuel cell 1 is restarted, the hydrogen feedback process is performed. Accordingly, when the fuel cell 1 is restarted, hydrogen can be inhibited from remaining in the oxidizing agent electrode 12 side of the fuel cell 1. When the fuel cell 1 is restarted, the fuel valve 22, the fuel outlet blocking valve 23 are opened, and the fuel gas containing hydrogen as a major component is supplied to the fuel electrode 11 of the fuel cell 1 from the fuel-supply passage 2. Further, the oxidizing-agent valve 32, the oxidizing-agent outlet blocking valve 33 are opened, and the oxidizing-agent gas (generally air) containing oxygen as a major component is supplied to the oxidizing agent electrode 12 of the fuel cell from the oxidizing-agent-supply passage 3. Thus, electricity-generating reaction occurs in the fuel cell 1, and electricity is thus generated.

According to this example in which hydrogen is inhibited from remaining in the oxidizing agent electrode 12 side as described above, when the fuel cell 1 is restarted, interactions between oxygen and hydrogen can be inhibited both in the fuel electrode 11 side and the oxidizing agent electrode 12 side of the fuel cell 1. As a result, according to this example, when the fuel cell 1 starts next electricity-generating operation, possibility of interactions with hydrogen and oxygen freshly supplied to the fuel cell 1 can be reduced, and chemical short and local cell phenomena can be inhibited. Because, as described above, the possibility of interactions with hydrogen or oxygen freshly supplied to the fuel cell 1 can be reduced as described above, a purge process can be abolished in which inert gas such as nitrogen gas is sealed into the fuel electrode 11 side and the oxidizing agent electrode 12 side of the fuel cell 1 for purging. Further, a storage container such as a tank for storing inert gas can be eliminated. However, depending on the circumstances, this example can employ such an inert gas sealed into the fuel electrode 11 side and the oxidizing agent electrode 12 side for purging.

The reason why the amount of oxygen in the fuel electrode 11 side is set larger than the amount of oxygen in the oxidizing agent electrode 12 side in terms of chemical equivalent in the embodiment is as follows. Because the electrolyte membrane 10 is cation exchangeable, after oxygen remaining in the oxidizing agent electrode 12 side of the fuel cell 1 is consumed in the discharge process, even when hydrogen in the fuel electrode 11 side is transferred to the oxidizing agent electrode 12 side of the fuel cell 1 by effects of concentration cell or hydrogen transfer through the electrolyte membrane 10, opposite reaction of concentration cell can be induced by energy from the external electric power source 60 and protons ($H^+$) can be fed back to the fuel electrode 11 side from the oxidizing agent electrode 12 side through the electrolyte membrane 10.

Incidentally, if the amount of oxygen remaining in the oxidizing agent electrode 12 side of the fuel cell 1 is larger than the amount of hydrogen remaining in the fuel electrode 11 side of the fuel cell 1 in terms of chemical equivalent, part of oxygen, remaining in the oxidizing agent electrode 12 side of the fuel cell 1 transferred to the fuel electrode 11 side of the fuel cell 1 by oxygen transfer after hydrogen in the fuel electrode 11 side of the fuel cell 1 is consumed in the discharge process, cannot be easily fed back to the oxidizing agent electrode 12 side.

Figure 5:
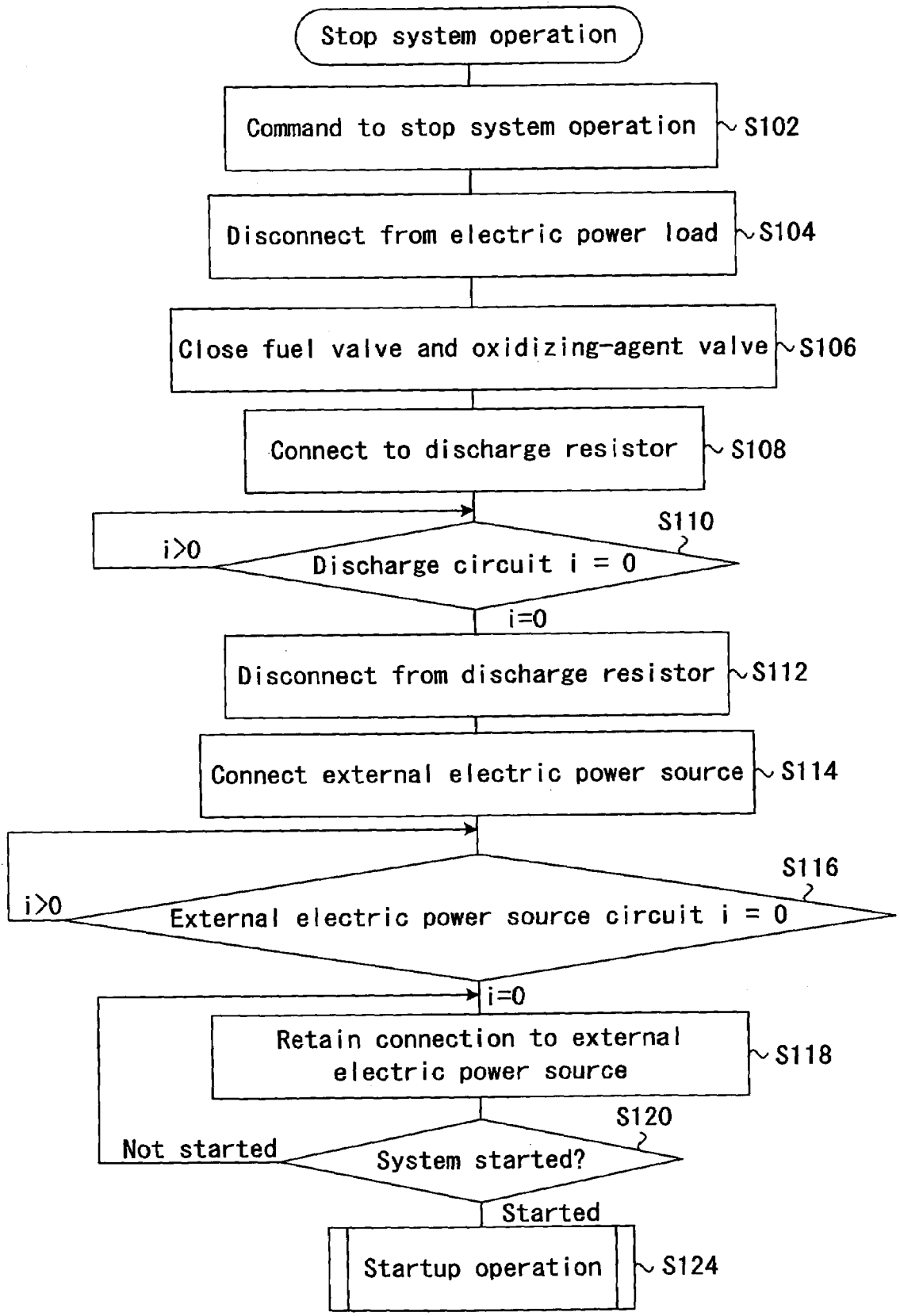
FIG. 5 represents a flow chart illustrating a control program run by a control apparatus.

FIG. 5 represents a flow chart illustrating an example of a control performed by a control apparatus. When a stop command of the fuel cell is transmitted (step S102), the disconnecting process is performed in which the electric power load 40 is electrically disconnected from the fuel cell 1 (step S104). Next, the valve closing process is performed in which the fuel valve 22, the fuel outlet blocking valve 23, oxidizing-agent valve 32, and the oxidizing-agent outlet blocking valve 33 are closed so that the amount of hydrogen contained in the fuel gas remaining in the fuel electrode 11 side of the fuel cell 1, becomes richer than the amount of oxygen remaining in the oxidizing agent electrode 12 side in terms of chemical equivalent (step S106). Then, the discharge process is performed in which the discharge resistor 50 is electrically connected to the fuel cell 1 (step S108). Then, the control apparatus judges whether the level of current flowing in the discharge circuit 5 becomes 0 ampere or not (step S110). If the level of current flowing in the discharge circuit 5 becomes 0 ampere, the discharge resistor 50 is disconnected from the fuel cell 1 (step S112). Next, the hydrogen feedback process is performed in which the external electric power source 60 is electrically connected to the fuel cell 1 (step S114). Then, the control apparatus judges whether the level of current flowing in the external electric power source circuit 6 becomes 0 ampere or not (step S116). If the level of current flowing in the external electric power source circuit 6 becomes 0 ampere, hydrogen can be assumed to be absent in the oxidizing agent electrode 12. Until the fuel cell 1 is restarted, the hydrogen feedback process is continuously performed (step S118). When the fuel cell 1 is restarted, a restart process is performed (step S120, 124).

According to the control described above, processes are performed according to an order, the disconnecting process (step S104), the valve closing process (step S106), and the discharge process (step S108). However, it is not limited. Processes can be performed in another order, the disconnecting process, the discharge process, and the valve closing process. Alternatively, processes can be performed in still another order, the valve closing process, the disconnecting process, and the discharge process, or in still another order, the valve closing process, the discharge process, and the disconnecting process. As described above, a time sequence of the disconnecting process, the valve closing process, and the discharge process is not particularly limited. The disconnecting process, the valve closing process, and the discharge process can be performed at the same time.

Next, a test example will be explained. A test was performed for confirming effects obtainable from the example of the present invention. In this test example, a unit cell evaluation apparatus for a fuel cell was utilized. In this case, each of an electrode area of the fuel electrode 11 and the oxidizing agent electrode 12 of the fuel cell was set to 59 $cm^2$, and each of volume of the fuel electrode 11 side and the oxidizing agent electrode 12 side of the fuel cell 1 was set to 186 cc. Then, electricity was generated under the condition that a cell temperature was 75° C., simulated reformate gas off natural gas ($H_2:CO_2:N_2=76:19:5$ in terms of flow rate ratio) was supplied to the fuel electrode 11 side at normal pressure, and air is supplied to the oxidizing agent electrode 12 at normal pressure. After the electricity-generating operation was stopped, both terminals of the fuel cell 1 were switched to the discharge circuit 5 including a discharge resistor of 0.1 ohm to perform the discharge process. At the same time, the valve closing process was performed in which valve apparatuses of a gas inlet and a gas outlet of the fuel electrode 11 are closed, and in which valve apparatuses of a gas inlet and a gas outlet of the oxidizing agent electrode 12 are closed. By doing so, gases were sealed in the fuel cell 1. When the level of current flowing in the discharge circuit 5 became zero ampere, both terminals of the fuel cell 1 were switched to the external electric power source 60 including a lead battery and the external electric power source circuit 6 including a variable resistor. Thus, the hydrogen feedback process was performed.

The variable resistor was controlled so that 0.3 volt could be applied to the unit cell of the fuel cell from the external power source circuit 6. When the level of current flowing in the external electric power source circuit 6 became zero ampere, composition of gases in the oxidizing agent electrode 12 side and the fuel electrode 11 side of the fuel cell 1 was measured with use of a gas chromatography apparatus (Shimadzu Corporation, GC-14B, measurable lower limit=10 ppm). According to the measurement result, oxygen and hydrogen were not detected in the oxidizing agent electrode 12 side. Thus, hydrogen did not remain in the oxidizing agent electrode 12 side. Hydrogen was detected in the fuel electrode 11 side. As can be seen in this test example, when the fuel cell 1 starts next operation, interactions with hydrogen and oxygen freshly supplied to the fuel cell 1 can be inhibited, and chemical short and local cell phenomena can be inhibited.

Incidentally, a voltage applied to the unit cell of the fuel cell from the external electric power source circuit 6 in the hydrogen feedback process is set lower than a start voltage of water electrolysis and higher than a cell voltage of the unit cell.

Next, a comparative example will be explained. In the comparative example, an apparatus and procedures similar to the test example described above were utilized for the test. The discharge process was performed in which the discharge resistor 50 was electrically connected to the fuel cell 1. However, the hydrogen feedback process was not performed. In other words, switching to the external electric power source circuit 6 was not performed, and the electric connection of the discharge circuit 5 to the fuel cell 1 was maintained. When the level of current flowing in the discharge circuit 5 became zero ampere, composition of gases in the oxidizing agent electrode 12 side and the fuel electrode 11 was measured with use of the gas chromatography apparatus in a similar way described above. According to the measurement results, in the oxidizing agent electrode 12 side, oxygen was not detected, but 18% by volume of hydrogen was detected. Hydrogen was detected in the fuel electrode 11 side.

Figure 6:
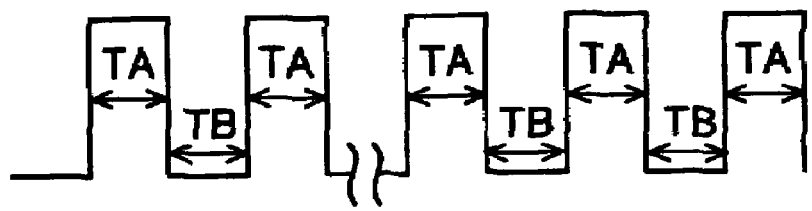
FIG. 6 represents a timing chart for performing a hydrogen feedback process according to a second example.

A second example will be explained. FIG. 6 represents a second example of the present invention. This example has similar configurations, actions and effects to the first example described above. Accordingly, difference from the first example will be mainly explained. In the first example described above, when the fuel cell stops operation, the hydrogen feedback process is performed continuously after the disconnecting process, the valve closing process, and the discharge process are performed. Then, until the fuel cell is restarted, the hydrogen feedback process is continuously performed.

According to the second example, as illustrated in FIG. 6, when the fuel cell 1 stops operation, the disconnecting process, the valve closing process, and the discharge process are performed in a similar way to the first example. However, the hydrogen feedback process is intermittently performed (performed for duration of time TA) at plural times at intervals TB. While the duration of time TB when the hydrogen feedback process is interrupted, there is a danger that hydrogen existing in the fuel electrode 11 of the fuel cell 1, the hydrogen contained in the fuel, transfers to the oxidizing agent electrode 12 through the electrolyte membrane 10. However, because the hydrogen feedback process is resumed after the duration of time TB when the hydrogen feedback process is interrupted, and is performed for a duration of time TA, hydrogen transferred to the oxidizing agent electrode 12 from the fuel electrode 11 through the electrolyte membrane 10 is fed back to the fuel electrode 11 according to chemical equations (5) and (6) described above. Accordingly, when the fuel cell is restarted, hydrogen does not substantially remain in the oxidizing agent electrode 12 side. Therefore, at the time of restarting the fuel cell, a possibility of interactions between hydrogen and oxygen supplied to the fuel cell 1 can be reduced, and chemical short and local cell phenomena can be inhibited.

Figure 7:
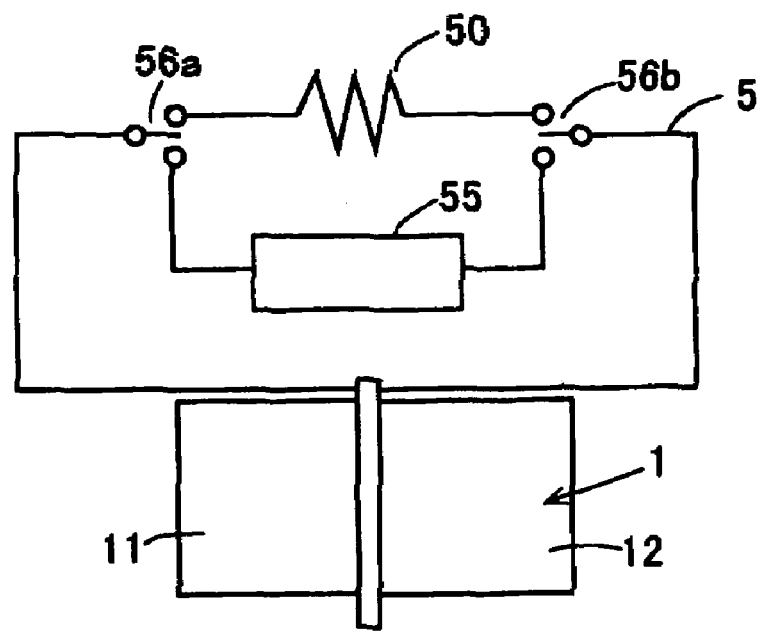
FIG. 7 represents a schematic diagram illustrating a discharge circuit having a discharge resistor and a chargeable portion according to a third example.

Next, a third example will be explained. FIG. 7 represents a schematic view of the third example of the present invention. This example has similar configurations, actions and effects to the first example described above. Accordingly, difference from the first example will be mainly explained. In this example, as illustrated in FIG. 7, the discharge circuit 5 includes a discharge resistor 50 and a chargeable portion 55 for charging electric energy emitted from the fuel cell 1. Switching elements 56a and 56b switch between the discharge resistor 50 and the chargeable portion 55. As the chargeable portion 55, a chargeable secondary battery, a condenser, or a electricity capacitor or the like, can be employed.

In the third example, when the fuel cell 1 stops operation, the disconnecting process is performed in which the electric power load 40 is electrically disconnected from the fuel cell 1. Next, before the hydrogen feedback process, the remaining hydrogen controlling process is performed. The remaining hydrogen controlling process includes the valve closing process and the discharge process. In the valve closing process, the fuel valve 22, the fuel outlet blocking valve 23, the oxidizing-agent valve 32, and the oxidizing-agent outlet blocking valve 33 are closed according to timing that allows the amount of hydrogen remaining in the fuel electrode 11 side of the fuel cell 1, the hydrogen contained in the fuel gas, to become richer than the amount of oxygen remaining in the oxidizing agent electrode 12 side in terms of chemical equivalent. In this case, as described above, some factors can be considered such as a difference between a volume of the gas passage of the oxidizing agent electrode 12 side and that of the gas passage of the fuel electrode 11 side, a difference between a pressure of the oxidizing-agent gas in the oxidizing agent electrode 12 side and that of the fuel gas in the fuel electrode 11 side, a time difference between a time when the fuel valve 22 and the fuel outlet blocking valve 23 are closed and a time when the oxidizing-agent valve 32 and the oxidizing-agent outlet blocking valve 33 are closed, or some other factors.

The discharge process is performed after the fuel cell 1 stops operation. The discharge process includes a process for charging the chargeable portion 55 of which voltage and a process for electrically connecting the fuel electrode 11 to the oxidizing agent electrode 12 of the fuel cell 1 through the discharge resistor 50 of the discharge circuit 5 is lower than a predetermined value from the fuel cell 1. In this case, firstly, the fuel cell 1 is electrically connected to the chargeable portion 55 by the switching elements 56a and 56b for charging the chargeable portion 55. When a voltage between the terminals of the fuel cell 1 becomes identical with that of the chargeable portion 55, the fuel cell 1 is electrically connected to the discharge resistor 50 by the switching element 56 in order to stop charging. Incidentally, the chargeable portion 55 can be charged after the fuel cell 1 is electrically connected to the discharge resistor 50.

Next, a fourth example will be explained. This example has similar configurations, actions and effects to the first example described above. Accordingly, difference from the first example will be mainly explained. In this example, when the fuel cell stops operation, similarly to the first example, the disconnecting process for disconnecting the electric power load 40 from the fuel cell 1, the valve closing process, the discharge process, and the remaining hydrogen controlling process are performed. The disconnecting process, the valve closing process, and the discharge process can be performed simultaneously. Alternatively, the disconnecting process, the valve closing process, and the discharge process can be performed with some time delay. A time sequence of the disconnecting process, the valve closing process, and the discharge process is not particularly limited.

In this example, the hydrogen feedback process is performed for a predetermined period of time. Accordingly, if a stop time until the fuel cell is restarted becomes long, there is a danger that hydrogen in the fuel electrode 11 side of the fuel cell 1 permeates into the oxidizing agent electrode 12 side through the electrolyte membrane 10.

For compensating this, in this example, just before the fuel cell is restarted, the hydrogen feedback process is performed in which the third switching element 63a is turned ON. In this case, the first switching element 43 and the third switching element 63a are OFF, and the electric power load 40, the discharge resistor 50 and the fuel cell 1 are not electrically connected.

When the hydrogen feedback process is performed as described above, in the oxidizing agent electrode 12 side, hydrogen existing in the oxidizing agent electrode 12 side is oxidized into protons and electrons according to chemical equation (6) illustrated in FIG. 4 as described above. The protons are fed back to the fuel electrode 11 side through the electrolyte membrane 10. Then, the protons fed back to the fuel electrode 11 side are reduced into hydrogen again according to chemical equation (5) illustrated in FIG. 4. In the hydrogen feedback process, the fact that the level of current flowing in the external electric power source circuit 6 becomes 0 ampere corresponds to a fact that the amount of hydrogen in the oxidizing agent electrode 12 side becomes 0. Accordingly, the fuel cell 1 is restarted after the level of current flowing in the external electric power source circuit 6 is detected to be 0 ampere. When the fuel cell 1 is restarted, the fuel valve 22 and the fuel outlet blocking valve 23 are opened and the fuel gas containing hydrogen as a major component is supplied to the fuel electrode 11 of the fuel cell 1 from the fuel-supply passage 2. Further, the oxidizing-agent valve 32 and the oxidizing-agent outlet blocking valve 33 are opened and the oxidizing-agent gas containing oxygen as a major component is supplied to the oxidizing-agent electrode 12 of the fuel cell 1 from the oxidizing-agent-supply passage 3.

Next, a fifth example will be explained. This example has similar configurations, actions and effects to the first example described above. Accordingly, difference from the first example will be mainly explained. In the first example, when the fuel cell stops operation, the disconnecting process for electrically disconnecting the electric power load 40 from the fuel cell 1, the valve closing process, the discharge process, and the hydrogen feedback process are performed. The disconnecting process, the valve closing process, and the discharge process can be performed simultaneously. Alternatively, the disconnecting process, the valve closing process, and the discharge process can be performed with some time delay. A time sequence of the disconnecting process, the valve closing process, and the discharge process is not particularly limited.

On the other hand, according to the fifth example, when the operation of the fuel cell 1 is temporary stopped, the disconnecting process in which the electric power load 40 is electrically disconnected from the fuel cell 1, the valve closing process, the discharge process, and the hydrogen feedback process are performed. Then, after the temporal stop, the fuel cell is restarted. When the fuel cell is restarted, the fuel valve 22 and the fuel outlet blocking valve 23 are opened and the fuel gas containing hydrogen as a major component is supplied to the fuel electrode 11 of the fuel cell 1 from the fuel-supply passage 22. Further, the oxidizing-agent valve 32 and the oxidizing-agent outlet blocking valve 33 are opened and the oxidizing-agent gas containing oxygen as a major component is supplied to the oxidizing agent electrode 12 of the fuel cell 1 from the oxidizing-agent-supply passage 3. By doing so, electricity-generating reaction occurs in the fuel cell 1, and electricity is thus generated. Accordingly, when the fuel cell is restarted, interactions between oxygen and hydrogen can be inhibited in the fuel electrode 11 side and in the oxidizing agent electrode 12 side of the fuel cell 1. As a result, according to this example, when the fuel cell 1 starts next operation, possibility of interaction with hydrogen and oxygen freshly supplied to the fuel cell 1 can be reduced, and chemical short and local cell phenomena can be inhibited.

Incidentally, FIG. 1 represents a case in which a unit cell is employed. However, our scope of the invention should not be limited only to the case of the unit cell. When layers of plural cells are employed, in the hydrogen feedback process described above, a voltage of the external electric power source can be raised according to increase of the number of cells stacked.

The method for operating a fuel cell according to the embodiment described above can be applied to a fuel cell electricity-generating system for a vehicle, for a system for stationing, for an electric device, for an electronic device, or for a mobile device.

According to an aspect of the present invention, in a method for operating a fuel cell including an electrolyte membrane sandwiched by a fuel electrode to which a fuel is supplied and an oxidizing agent electrode to which an oxidizing agent is supplied for generating electricity supplied to an electric power load, the method includes a hydrogen feedback process either before starting operation of the fuel cell or after stopping operation of the fuel cell. The hydrogen feedback process includes the processes of a process for electrically connecting a positive electrode of an external electric power source to the oxidizing agent electrode of the fuel cell, a process for electrically connecting a negative electrode of the external electric power source to the fuel electrode of the fuel cell, a process for oxidizing hydrogen remaining in the oxidizing agent electrode to generate protons, the hydrogen contained in the fuel, and a process for reducing the protons, transferred to the fuel electrode from the oxidizing agent electrode through the electrolyte membrane, into hydrogen.

According to the aspect of the present invention, in the hydrogen feedback process, the positive electrode of the external electric power source and the oxidizing agent electrode of the fuel cell are electrically connected, and the negative electrode of the external electric power source and the fuel electrode of the fuel cell are electrically connected.

Even when hydrogen remains in the oxidizing agent electrode of the fuel cell, the hydrogen feedback process oxidizes hydrogen remaining in the oxidizing agent electrode of the fuel cell, the hydrogen contained in the fuel, into protons, and reduces the protons, transferred to the fuel electrode from the oxidizing agent electrode through the electrolyte membrane, into hydrogen. By doing so, hydrogen transferred to the oxidizing agent electrode from the fuel electrode through the electrolyte membrane is fed back to the fuel electrode. Accordingly, even when hydrogen flows into the oxidizing agent electrode from the fuel electrode, hydrogen is inhibited from remaining in the oxidizing agent electrode.

According to a further aspect of the present invention, in the method for operating the fuel cell, when the fuel is supplied to the fuel electrode of the fuel cell and the oxidizing agent is supplied to the oxidizing agent electrode of the fuel cell for restarting the operation of the fuel cell, interactions between hydrogen remaining in the oxidizing agent electrode and oxygen freshly supplied to the oxidizing agent electrode can be inhibited. Accordingly, chemical short and local cell phenomena can be advantageously inhibited.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A method for operating a fuel cell including an electrolyte membrane sandwiched by a fuel electrode to which a fuel is supplied and an oxidizing agent electrode to which an oxidizing agent is supplied for generating electricity supplied to an electric power load, the method comprising:
   a hydrogen feedback process performed either before starting an operation of the fuel cell or after stopping the operation of the fuel cell, the hydrogen feedback process including:
      electrically connecting a positive electrode of an external electric power source to the oxidizing agent electrode of the fuel cell;
      electrically connecting a negative electrode of the external electric power source to the fuel electrode of the fuel cell;
      oxidizing hydrogen remaining in the oxidizing agent electrode to generate protons;
      reducing the protons, transferred to the fuel electrode from the oxidizing agent electrode through the electrolytic membrane, into hydrogen; and
      controlling, before the hydrogen feedback process, a remaining amount of hydrogen remaining in the fuel electrode side of the fuel cell, the hydrogen contained in the fuel, to be richer than an amount of oxygen remaining in the oxidizing agent electrode side of the fuel cell in terms of chemical equivalent.

2. The method for operating the fuel cell according to claim 1, further comprising:
   electrically disconnecting the fuel cell from the electric power load before the hydrogen feedback process.

3. The method for operating the fuel cell according to claim 1, wherein the hydrogen feedback process is intermittently performed with a time interval.

4. The method for operating the fuel cell according to claim 1, wherein a voltage of the external electric power source used in the hydrogen feedback process is set so that a voltage, lower than a start voltage of water electrolysis but higher than a voltage generated by a unit cell, is applied to the unit cell of the fuel cell.

5. The method for operating the fuel cell according to claim 1, wherein the controlling includes discharging by electrically connecting the fuel electrode to the oxidizing agent electrode of the fuel cell through an electric power-consuming portion.

6. The method for operating the fuel cell according to claim 5, wherein the hydrogen feedback process is performed when either a current flowing between the fuel electrode and the oxidizing agent electrode becomes a threshold current or less or a potential difference between the fuel electrode and the oxidizing agent electrode becomes a threshold voltage or less is fulfilled in the discharging.

7. The method for operating the fuel cell according to claim 5, wherein the electric power-consuming portion includes a discharge resistor.

8. The method for operating the fuel cell according to claim 5, wherein the electric power-consuming portion includes a discharge resistor and a chargeable portion for storing electric energy generated by the fuel cell.

9. The method for operating the fuel cell according to claim 1, wherein the fuel cell includes:
   a fuel valve for supplying fuel to the fuel electrode side;
   a fuel outlet blocking valve for blocking an ejection of the fuel from the fuel electrode side;
   an oxidizing-agent valve for supplying the oxidizing agent to the oxidizing agent electrode; and
   an oxidizing-agent outlet-blocking valve for blocking an ejection of the oxidizing agent from the oxidizing agent electrode sides,
   wherein the controlling includes a valve closing process for closing the fuel valve, the fuel outlet blocking valve, the oxidizing-agent valve and the oxidizing-agent outlet-blocking valve so that the amount of hydrogen in the fuel electrode side becomes richer than the amount of oxygen in the oxidizing agent electrode side in terms of chemical equivalent.

10. The method for operating the fuel cell according to claim 6, wherein the threshold current is 0 ampere.

11. The method for operating the fuel cell according to claim 6, wherein the threshold voltage is 0 volt.

12. The method for operating the fuel cell according to claim 8, wherein the chargeable portion is at least one of a secondary battery, a condenser, and a electricity capacitor.

13. The method for operating the fuel cell according to claim 8, wherein in the discharge process, the electric energy generated by the fuel cell is charged into the chargeable portion, and thereafter, the electric energy generated by the fuel cell is discharged into the discharge resistor.

14. The method for operating the fuel cell according to claim 9, wherein the valve closing process is controlled by controlling timings for closing the fuel valve, the fuel outlet-blocking valve, the oxidizing-agent valve, and the oxidizing-agent outlet-blocking valve.

15. The method for operating the fuel cell according to claim 9, wherein the valve closing process is controlled on the basis of a difference between a pressure of gas sealed in the fuel electrode side and a pressure of gas sealed in the oxidizing agent electrode side when the valves are closed.

16. The method for operating the fuel cell according to claim 1, wherein the hydrogen feedback process is performed just before the fuel cell operation is restarted.

17. The method for operating the fuel cell according to claim 2, wherein the hydrogen feedback process is intermittently performed with a time interval.

18. The method for operating the fuel cell according to claim 2, wherein a voltage of the external electric power source used in the hydrogen feedback process is set so that a voltage, lower than a start voltage of water electrolysis but higher than a voltage generated by a unit cell, is applied to the unit cell of the fuel cell.

* * * * *